Figure 4:
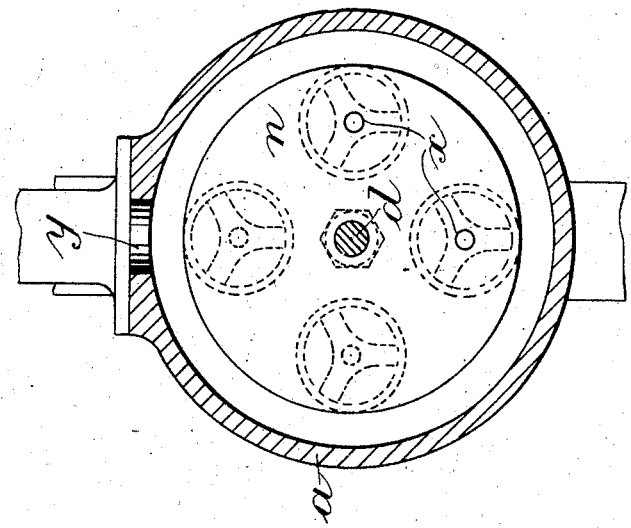

No. 878,772. PATENTED FEB. 11, 1908.
T. A. CLAYTON.
MULTIPLE WAY VALVE APPLICABLE TO DEVICES FOR GASEOUS
FIRE EXTINCTION, &c.
APPLICATION FILED FEB. 19, 1907.
3 SHEETS—SHEET 1.
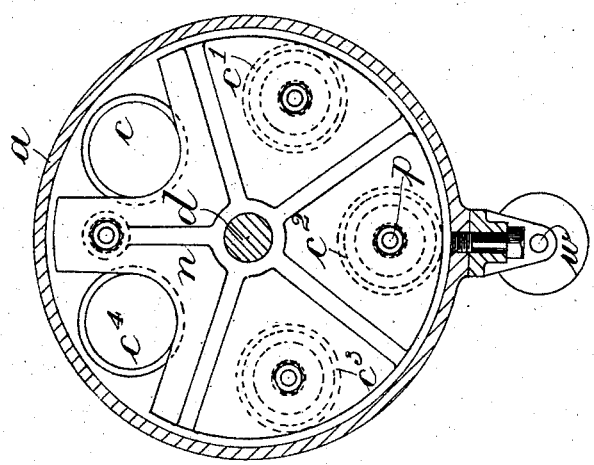
Fig. 2.
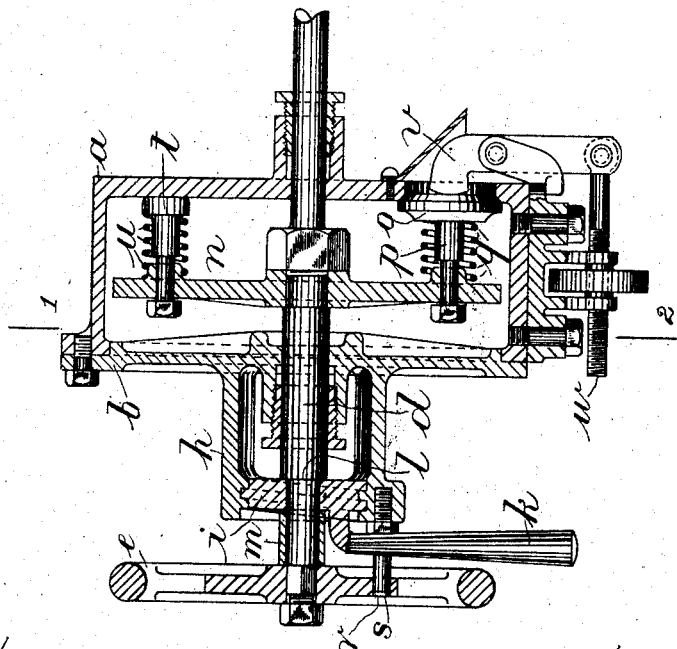
Fig. 1.
WITNESSES
INVENTOR
Thomas Adam Clayton
ATTY.

No. 878,772. PATENTED FEB. 11, 1908.
T. A. CLAYTON.
MULTIPLE WAY VALVE APPLICABLE TO DEVICES FOR GASEOUS
FIRE EXTINCTION, &c.
APPLICATION FILED FEB. 19, 1907.

3 SHEETS—SHEET 2.

WITNESSES
INVENTOR
Thomas Adam Clayton

ATTY

No. 878,772. PATENTED FEB. 11, 1908.
T. A. CLAYTON.
MULTIPLE WAY VALVE APPLICABLE TO DEVICES FOR GASEOUS
FIRE EXTINCTION, &c.
APPLICATION FILED FEB. 19, 1907.

3 SHEETS—SHEET 3.

WITNESSES
INVENTOR
Thomas Adam Clayton.
By Wm Wallace White
ATT'Y.

UNITED STATES PATENT OFFICE.

THOMAS ADAM CLAYTON, OF PARIS, FRANCE.

MULTIPLE-WAY VALVE APPLICABLE TO DEVICES FOR GASEOUS FIRE EXTINCTION, &c.

No. 878,772.

Specification of Letters Patent.

Patented Feb. 11, 1908.

Application filed February 19, 1907. Serial No. 358,276.

*To all whom it may concern:*

Be it known that I, THOMAS ADAM CLAYTON, citizen of the United States of America, residing at Paris, France, have invented new and useful Improvements in Multiple-Way Valves Applicable to Devices for Gaseous Fire Extinction and Fumigation of Closed Compartments, of which the following is a specification.

This invention relates to multiple-way valves applicable to devices for gaseous fire extinction and fumigation of closed compartments and has for its object the construction and arrangement of mechanism whereby the various valves are made to open and close in a given order.

The invention consists in adapting various valves to diverse openings which can be connected to various parts of my gaseous fire extinction and fumigation devices in which a sulfurous acid generator and cooler are used as applicable to a closed chamber as described in Patent 661496 granted to me, so that at least two of the said various openings may be left open to one another at any time and further that the different positions of the valves for any two or more of the said orifices will be so locked and their position be made evident to the man in charge of the machine.

To carry this invention into effect, I make in the present instance, four connections to the base of a convenient chamber, the first connection leading to the generator; the second from the compartment under treatment;
the third to the cooler; the fourth to an admission for fresh air; and a fifth which in the device described is blank. Over these five places I provide three valves that are supported from a rotatable disk or frame which may be turned by an external handwheel when the valves have been lifted from their seats.

In order that this invention may be the better undertsood I now proceed to describe the same in relation to the accompanying drawings, reference being had to the letters and figures marked thereon.

Like letters refer to like parts in the various figures.

Figure 3:
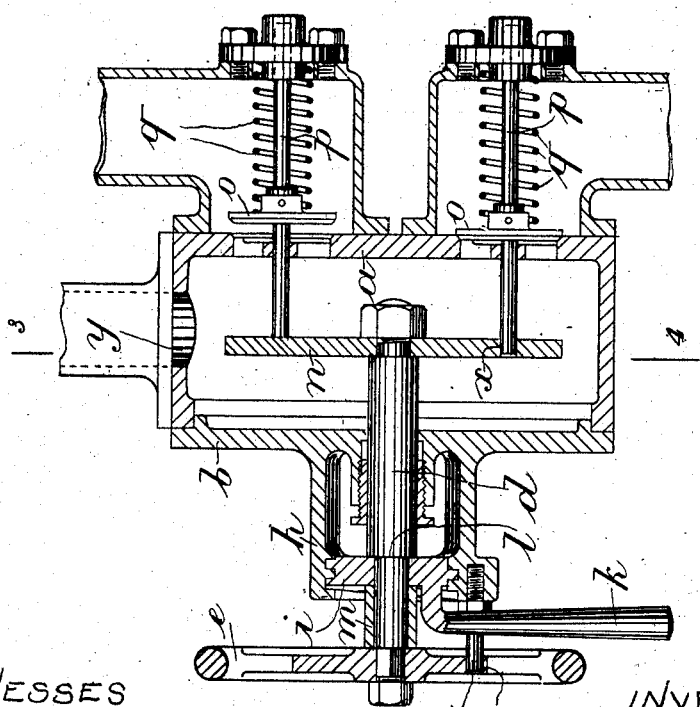
Figure 6:
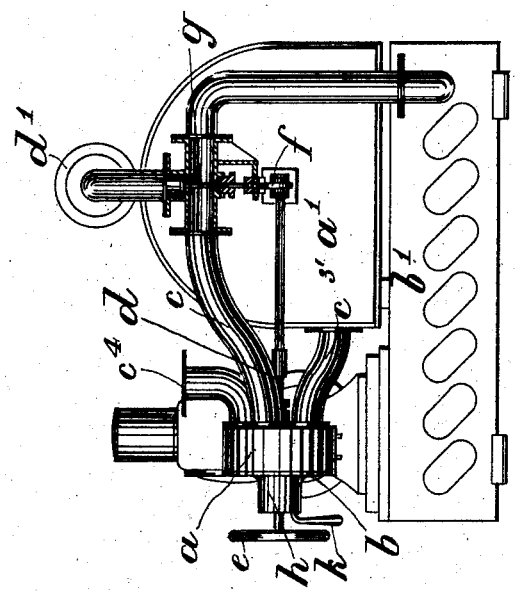
Figure 5:
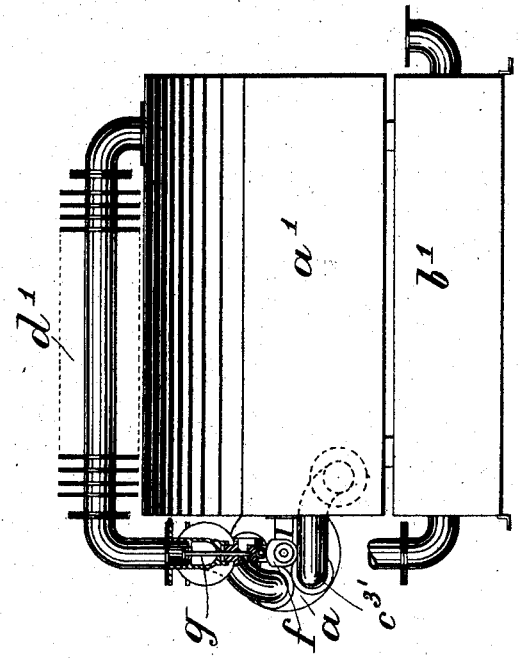

Figure 1 is a sectional view of one form of my invention. Fig. 2 is a sectional plan on the line 1, 2 of Fig. 1. Fig. 3 is a sectional view of a modified construction. Fig. 4 is a sectional plan on the line 3, 4 of Fig. 3. Figs. 5 and 6 show the arrangement of the cam in conjunction with the multiple way valve and the coaction of the said cam with the stop valve controlling the admission of gas from the generator to the cooler.

Referring to Fig. 1, $a$ is a circular box provided with a bolted on cover $b$, the box being arranged with five valve seats $c\ c'\ c^2\ c^3$ and $c^4$ in the base thereof equally distributed about the center. One of these valve seats $c'$ is blank and is provided only for the reception of one of the valves which in certain positions of the device would not otherwise be employed.

This device arranges all separate valves of my apparatus as shown in #661496 into a distinct chamber $a$ of which the orifice $c^4$ goes to the top of the compartment under treatment which is not shown. From there it brings the upper portion of air down to this valve box, and may allow this air to be passed to the sulfur generator $a'$ by the exit $c^3$ Fig. 2 and the pipe $c^{3\prime}$ Figs. 5 and 6 while the other exit $c$ to the cooler is closed as well as the air passage $c^2$. The gas $SO_2$ being generated in the furnace $a'$ and passing by the pipe $d'$, the valve $g$ being open, proceeds onwards to the cooler $b'$ from which it is drawn by an exhauster (not shown) and passed on to the under circumference of the compartment. When this has been going on for some time and the product taken by $c^4$ from the compartment is $SO_3$, a fresh arrangement may be made by closing the exit $c^3$ while $c^4$ and $c$ remain open to one another. This connects the pipe from the compartment entering at $c^4$ to the cooler by the pipe $c$ the gas $SO_2$ being then circulated from the compartment through the cooler $b'$ while the valve $g$ is closed.

The admission of fresh air may be connected to the generator by the opening $c^3$ when air will be drawn in there by the exhaust or the air may be admitted separately to mix with the $SO_2$ passing from the compartment by the pipe $c^4$ either to the generator by the pipe $c^{3\prime}$ or to the cooler by the pipe $c$.

A shaft $d$ passes through the cover $b$ and is provided with a hand wheel $e$ rigidly carried by the said shaft. The other end of the shaft $d$ passes through the rear of the box $a$ and is provided with a cam $f$ adapted to coact with the working valve $g$. Arranged upon the cover $b$ is an internally threaded sleeve $h$ within which works an externally threaded washer $i$ which is provided with an operating handle $k$. The shaft $d$ is arranged to revolve freely in the washer $i$ but can only be moved longitudinally by the axial movement of the washer $i$ against the shoulder $l$ or the sleeve $m$ when the washer $i$ is rotated within the internally threaded device $h$. Within the box $a$ and attached to the shaft $d$ is a frame $n$ for holding three valves $o$ by means of thier spindles $p$, the valves being spring pressed away from the frame $n$ by springs $q$. These springs $q$ also serve to compensate for any inequalities in the length of the valve spindles $p$ and insure that each valve gets its share of the pressure necessary to close them all, which pressure is applied or released by means of the handle $k$ and washer $i$.

A stud $r$ is carried by the sleeve $h$ and is adapted to engage when the valves are in position to be closed with one of a series of holes $s$ in the center portion of the wheel $e$, the said holes $s$ being four in number in the present instance and spaced to coincide with the positions of the valves $o$ when they are brought to the desired positions. It will therefore be understood that this stud forms an indicator to the position of the valves $o$, a lock to prevent the turning of the shaft $d$ until the valves $o$ are clear of their seats, and a stop for the handle $k$ to avoid unnecessary rotation of same.

When the valves are distributed more to one side of the frame $n$ than the other a dummy device $t$ is provided to press upon the surface of the box between the valve seats by means of the spring $u$ and thus to compensate for pressure on the valves $o$ arranged on the other side of the frame $n$.

The method of operation is as follows:— The handle $k$ is rotated so as to draw in an outward direction the washer $i$ from the sleeve $h$ and with it the shaft $d$ the wheel $e$ and the frame $n$. During this operation the pressure is gradually removed from the springs $q$ and $u$ until the spindles $p$ come into tension, the valves $o$ leaving their seats so as to be clear of the base of the box $a$. At this point the center disk of the wheel $e$ is clear of the stud $r$ and may be turned to move the valves into any other position so that one of the holes $s$ against which the new position is marked is opposite the stud $r$ thus bringing the valves directly opposite the required valve seats. The handle $k$ is now moved in a reverse direction causing the particular hole $s$ to engage with the stud $r$ the valves $o$ to enter their seats and pressure to be applied to them by springs $q$.

The arrangement shown in Fig. 1 can be used when it is immaterial whether all the valves are open while a change is being made and when the desired orifices require to be full open as soon as the wheel is set. It may be pointed out that the usual changes required in my machine are, a connection from $c^4$ to $c^3$ and from $c^2$ to $c^3$ in both of which cases the valve $g$ is required to be open, a connection from $c^4$ to $c$ with valve $g$ shut and after this connection has been made some time the valve on the seating $c^2$ requires to be opened slightly and for this purpose the lever $v$ is pivoted on the under side of the box $a$ and is operated by an adjusting screw $w$ adapted to push the valve $o$ covering that orifice off its seat $c^2$ to a more or less extent according to the adjustment of the lever. The orifices $c^2$ and $c^4$ are inlets, the orifices $c$ and $c^3$ are outlets and the orifice $c'$ is a blank seating provided for the reception of one of the valves $o$ which in certain positions would not be otherwise employed. The orifice $c^2$ being merely for the admission of fresh air, the box $a$ is considered practically closed when the valves are on the seatings $c$ $c^3$ and $c^4$ and the seatings $c'$ and $c^2$ only have the valves away from them.

Figs. 3 and 4 show an alternative method of constructing the device in which the valves $o$ are kept on their seats by springs $q$ pressing on the bodies of the valves $o$ on the side opposite to the frame $n$, with holes $x$ arranged in the said frame so as to pass over all the spindles $p$ of the valves $o$ which it may be desired to leave closed while the frame $n$ presses against the spindles of those valves which it is desired to open. By this arrangement all valves are closed when a change is being made and the amount of opening of the valve or valves can be controlled by the handle $k$ while the stud $r$ in conjunction with one of the holes $s$ forms a guide to the positions of the holes $x$ with reference to the spindles $p$ and a lock in preventing the wheel $e$ being turned until the frame $n$ is drawn back clear of the spindles $p$.

In some cases I prefer to make the box $a$ with an inlet $y$ which is always open and to make all the valves outlets from the box and in such case I provide the frame $n$ with one less hole than the number of valve seats so that when one seat is only uncovered at a time the arrangement makes a good gas distributing valve. In some cases when the valves are small in size instead of employing the screw washer $i$ to put pressure on the valves $o$, I arrange a spring between the frame $n$ and the cover $b$ which can be put under initial compression when the cover $b$ is bolted down. To operate the valve under these conditions it is only necessary to pull the wheel $e$ against the spring pressure clear of the stud $r$ before turning it into the new position.

Having now particularly described and ascertained the nature of this invention and in what manner the same is to be performed, I declare that what I claim is:—

1. A multiple way valve consisting of a valve box having a number of valve seats arranged at the same distance from and around the center of said box, a series of spring pressed valves adapted to coact with the valve seats, a movable frame arranged within said valve box and adapted to coact with said valves and to be rotated about the center of said box, means for moving said frame in a direction parallel to or coincident with the axes of the valves and means for locating the position of the frame relative to the valve seats and locking same in position, substantially as described.

2. A multiple-way valve consisting of a valve box having a number of valve seats arranged at the same distance and around the center of said box, a series of spring pressed valves adapted to co-act with the valve seats, a movable frame arranged within said valve box and adapted to co-act with said valves and to be rotated about the center of said box, means for moving said frame in a direction parallel to or coincident with the axes of the valves, means for locating the position of the frame relative to the valve seats and locking same in position and an independent adjusting device fitted to the side of the said box adapted to open one valve to any desired amount, substantially as described.

3. A multiple-way valve consisting of a valve box having a number of valve seats arranged at the same distance and around the center of said box, a series of spring pressed valves adapted to co-act with the valve seats, a movable frame arranged within said valve box and adapted to co-act with said valves and to be rotated about the center of said box, means for moving said frame in a direction parallel to or coincident with the axes of the valves, means for locating the position of the frame relative to the valve seats and locking same in position a valve external to the said valve box and means for actuating said valve from the movable frame of the multiple-way valve.

In testimony whereof I have signed my name to this specification in the presence of two subscribing witnesses.

THOMAS ADAM CLAYTON.

Witnesses:
JACK H. BAKER,
HANSON C. COXE.